July 15, 1941.   J. RAWLEY ET AL   2,249,173

TRANSMISSION SHIFT MECHANISM

Filed March 28, 1940   2 Sheets-Sheet 1

Inventors
Joseph Rawley &
Donald P. Croisant

Attorneys

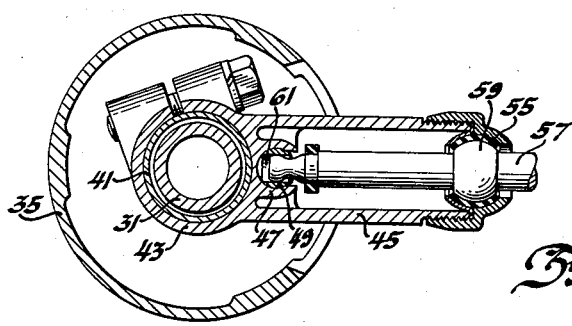
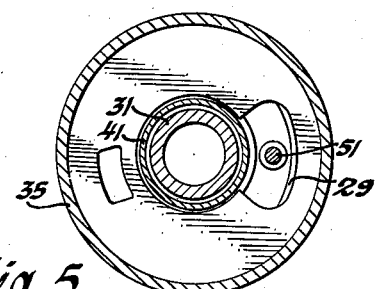
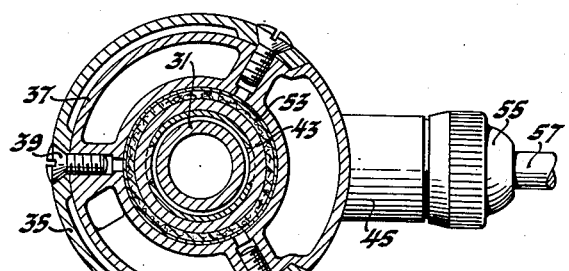
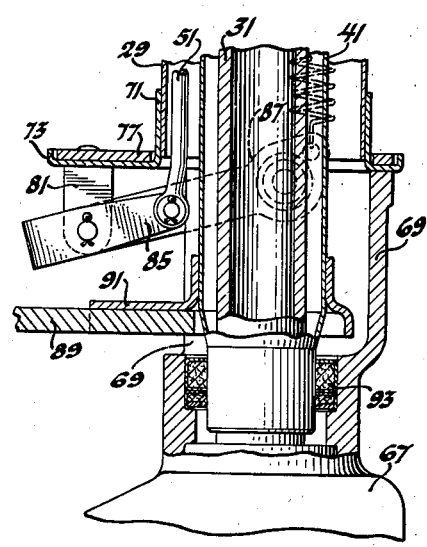
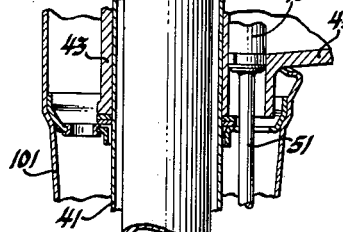
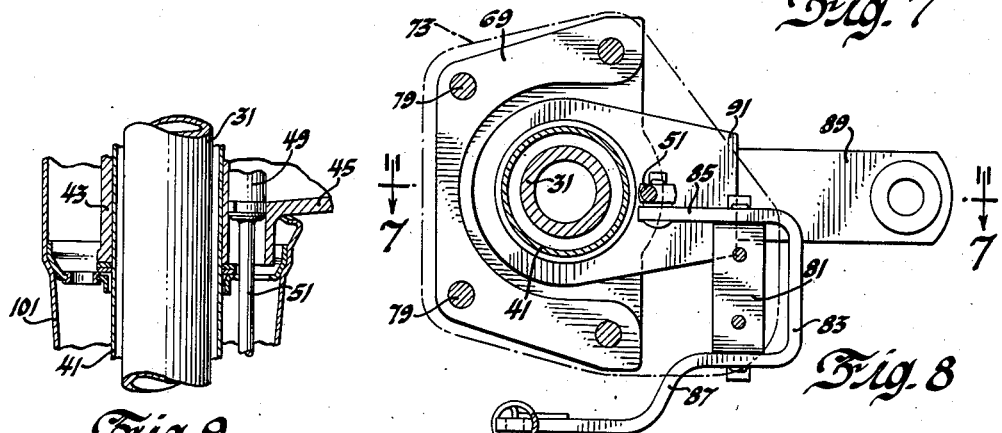

Patented July 15, 1941

2,249,173

UNITED STATES PATENT OFFICE 2,249,173

TRANSMISSION SHIFT MECHANISM

Joseph Rawley and Donald P. Croisant, Flint, Mich., assignors to General Motors Corporation, Detroit, Mich., a corporation of Delaware Application March 28, 1940, Serial No. 326,306

3 Claims. (Cl. 74—484)

This invention relates to change speed mechanism for vehicles and more particularly to an improvement in the remotely located actuating means by which the driving ratio provided by said mechanism is changed.

An object of the invention is to utilize the fixed steering mast of the vehicle to house members, the movements of which transmit the movements of a hand lever adjacent the steering wheel to the selecting and shifting members adjacent the transmission housing.

Other objects including an improved appearance, efficiency, simplicity and economy will be understood from the description which follows:

On the drawings:

Figure 4 is a section on line 4—4 of Figure 2.

Figure 5 is a section on line 5—5 of Figure 2.

Figure 6 is a section on line 6—6 of Figure 2.

Figure 7 is a vertical section adjacent the lower end of a steering mast, as seen on line 7—7 of Figure 8.

Figure 8 is a section on line 8—8 of Figure 1.

Figure 9 is a section corresponding to Figure 2 but showing the modified form.

Figure 1:
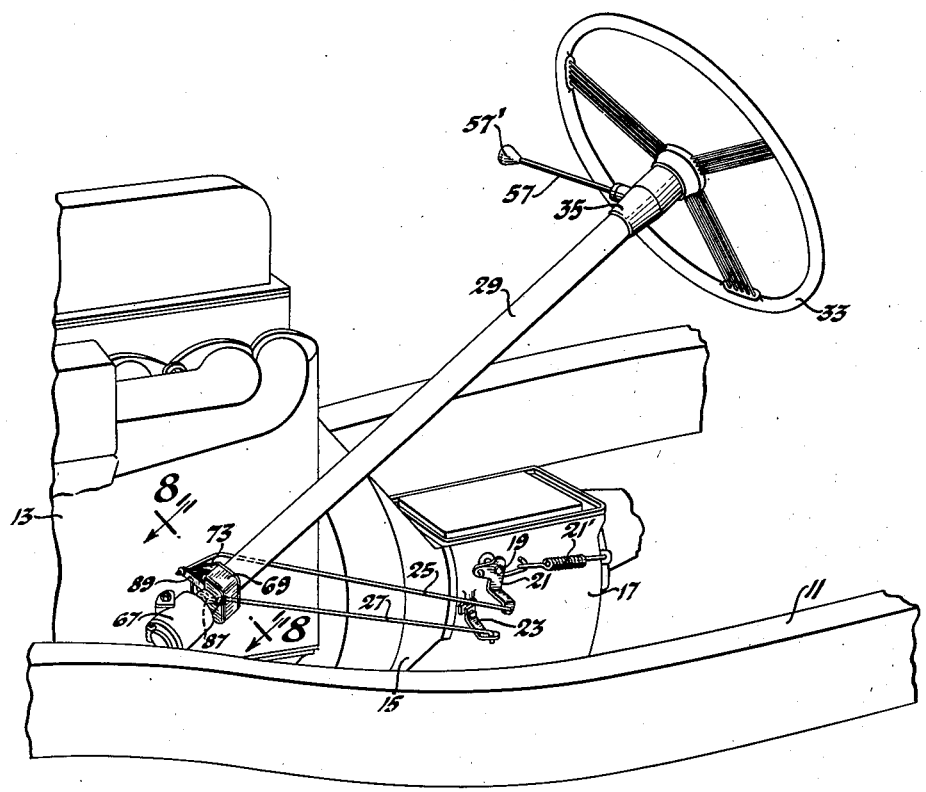
Figure 1 shows in perspective the invention applied to a vehicle chassis.
Figures 2, 3:
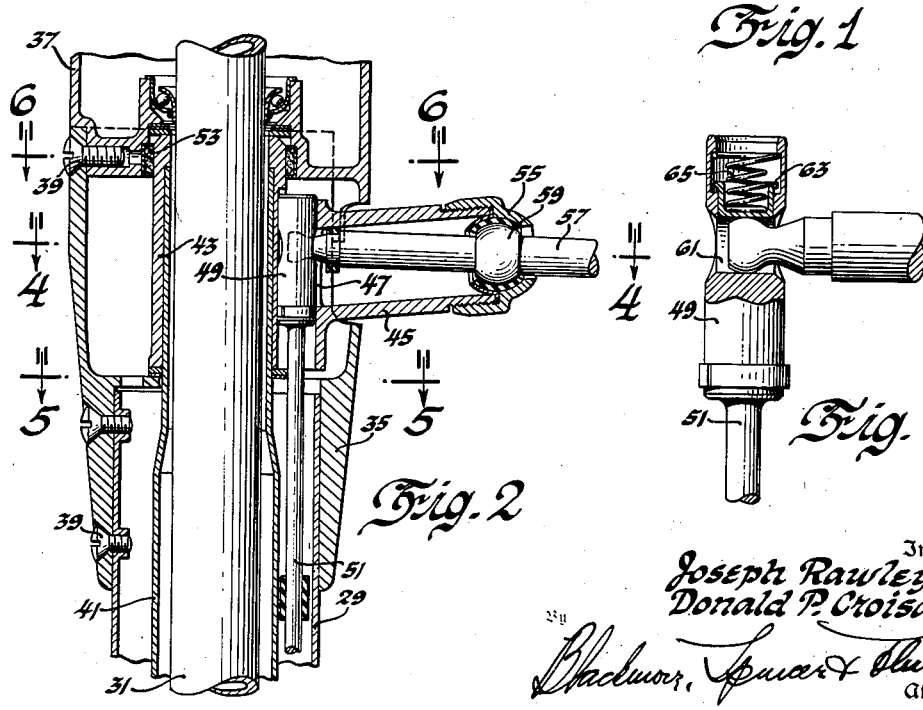
Figure 2 is a vertical section through the upper portion of the steering mast.
Figure 3 is a view in elevation, partly in section, of parts shown in Figure 2.

Referring to the several figures of the drawings, numeral 11 represents the vehicle frame, 13 the engine, 15 the clutch housing and 17 the transmission or change speed housing. A shaft 19 extends from within housing 17 and has an external lever 21 secured thereto. Rocking of this lever in one or the other direction of rotation makes shifts from neutral into low or reverse or from neutral into second or high speed, dependent upon the position of selector mechanism, the latter actuated by rotation of a lever 23. Spring 21' is arranged to assist the rotation of lever 21 as the lever moves from its neutral position to either of its active positions. Levers 21 and 23 are connected by links 25 and 27, respectively, to lever arms adjacent the lower end of the steering mast as will be hereinafter described.

At 29 is shown the fixed tubular steering mast having as its purpose to house the rotating steering post or shaft 31. The end steering wheel 33 is mounted on the end of shaft 31. To the top of mast 29 is secured an upper enlarged extension 35 and into the upper end of member 35 is inserted another extension member 37, the parts being secured together by fastening means 39. A shell 41 surrounds shaft 31 concentrically within the steering mast and spaced from the steering shaft. The upper end of shell 41 is surrounded by and firmly secured within a cylindrical member 43. This member is provided with a radial tubular extension 45. Within the extension 45 is a relatively short extension portion marked 47, shaped to guide for vertical reciprocation the enlarged head 49 of a rod 51. At 53 is a bearing carried by member 37 to accommodate the rotation of shell 41 and member 43.

A cap 55 is threaded to the end of extension 45. It serves to pivotally support in the end of extension 45 a lever 57 having a spherical bearing 59. This lever extends into an opening 61 in the head 49 of rod 51. An antirattling connection is provided by a cap 63 and a spring 65. It will be seen that vertical movements imparted to knob 57' on lever 57 reciprocate rod 51, which rod lies within the steering mast and in the annular space between the mast and the shell 41. The shell is rotated by a substantially horizontal rotation of lever 57.

The mast 29 does not extend to the housing 67 within which the gear elements are located for the purpose of steering. An intermediate member 69 which may be integral with the gear box or attached thereto, connects the gear box 67 to the lower end of the mast 29. This connection is made by a cylindrical member 71 secured around the lower end of the mast and having a flange 73 resting on the top of the intermediate member 69. The flange 73 is secured to the top of the intermediate member and to a reinforcing plate 77 by fastening means 79 and the flange 73 and the reinforcing plate 77 extend laterally beyond the member 69 as shown in Figures 7 and 8 and support a hanger at 81 which pivotally supports the intermediate part of a lever 83. Lever 83 has an inner arm 85 pivotally connected to the end of rod 51 and an outer arm 87 adapted to be connected to link 27. It will be seen that the intermediate member 69 has one side removed for the passage of the lever. Through this passage there also projects a lever 89 secured adjacent the end of the shell 41 by suitable fastening means 91. Lever 89 at its extremity is connected to link 25. A bearing 93 is provided in part 69 for the rotatable support of shell 41. A suitable spring is attached to the end of lever arm 87 whereby the rod 51 is normally held in that position for gear selection corresponding to high speed and second speed. When the knob 57' of lever 57 is lifted against the resistance of this spring, lever 23 actuated by link 27 selects the mechanism within the gear box 17 for subsequent shifting between low gear and reverse gear upon the rotation of the shell 41.

For convenience the term "steering column" is used to include the mast 29 together with the extensions 35 and 37 and the so-called "intermediate member" 69.

By the arrangements described, it will be seen that there are openings in the steering mast through which project the manually operable lever and levers 83 and 89. The vertical reciprocating rod 51 and the shell 41 are both within the fixed steering mast. There is thus avoided an external location of the operating parts. Also there is no occasion for enlarging the steering mast since the assembly described permits the use of the mast of conventional size.

We claim:

1. In remote control mechanism for a vehicle change speed transmission, a steering column, a steering shaft therein, a rotatable shell within said column, a reciprocable rod also within said column, a manually operable lever projecting into said column adjacent its upper end, said lever adapted to reciprocate said rod and to rotate said shell, lever arms extending into said column at the lower ends of said shell and rod and link means connected to said last named lever arms whereby selection and gear shifting are effected.

2. In remote control mechanism for a vehicle change speed transmission, a steering column, a steering shaft therein, a rotatable shell within said column, a reciprocable rod within said column, said shell surrounding said steering shaft and being concentric therewith, a manually operable lever projecting into said column adjacent its upper end, said lever adapted to reciprocate said rod and to rotate said shell, lever arms extending into said column at the lower ends of said shell and rod and link means connected to said last named lever arms whereby selection and gear shifting are effected.

3. In remote control transmission for a vehicle change speed transmission, a steering column, a steering shaft therein, a rotatable shell within said column, a reciprocable rod within said column, said rod being in the annular space between said shell and column, a manually operable lever projecting into said column adjacent its upper end, said lever adapted to reciprocate said rod and to rotate said shell, lever arms extending into said column at the lower ends of said shell and rod and link means connected to said last named lever arms whereby selection and gear shifting are effected.

JOSEPH RAWLEY.
DONALD P. CROISANT.